United States Patent [19]

Schulz et al.

[11] 4,122,050

[45] Oct. 24, 1978

[54] FOAMABLE POLYMER COMPOSITIONS

[75] Inventors: Johann G. D. Schulz, Pittsburgh; Edward T. Sabourin, Allison Park, both of Pa.

[73] Assignee: Gulf Research & Development Company, Pittsburgh, Pa.

[21] Appl. No.: 891,170

[22] Filed: Mar. 29, 1978

[51] Int. Cl.$^2$ .......................... C08J 9/14; C07C 63/33
[52] U.S. Cl. ........................ 521/95; 521/128; 521/143; 521/178; 562/435; 562/427; 562/434; 562/437; 562/426
[58] Field of Search .................. 260/2.5 HA, 2.5 EP, 260/2.5 N, 2.5 R, 515 P, 515 H

[56] References Cited

U.S. PATENT DOCUMENTS

| | | | |
|---|---|---|---|
| 3,966,653 | 6/1976 | Blunt et al. | 260/2.5 EP |
| 4,052,448 | 10/1977 | Schultz | 260/515 H |

*Primary Examiner*—Morton Foelak

[57] ABSTRACT

A foamable polymer composition comprising a resinous polymer and a mixture of polycyclic aromatic polycarboxylic acids that is substantially soluble in acetone and substantially soluble in water obtained as a result of the nitric acid oxidation of a carbonaceous material, such as coal.

17 Claims, No Drawings

FOAMABLE POLYMER COMPOSITIONS

BACKGROUND OF THE INVENTION

1. Field of the Invention

This invention relates to a foamable composition comprising a resinous polymer and a mixture of polycyclic aromatic polycarboxylic acids derived from a carbonaceous material, such as coal.

2. Description of the Prior Art

Foamed resinous polymers, such as thermoplastic or thermosetting polymers, are of significant commercial interest, because they are lightweight and relatively inexpensive, have excellent chemical stability and are easily fabricated into a wide variety of useful articles, such as insulated containers for cold foods, buoyant fillers for life preservers, toys, disposable coffee cups, etc.

In a typical foaming process, the foaming agent is admixed intimately with the resinous polymer and the mixture is heated in a mold above the decomposition temperature of a foaming agent, whereupon the foaming agent decomposes to yield gaseous products which cause the polymer to foam. Thereafter the polymer is cooled and retains its foamed configuration.

Desirably, the foaming agent should be inexpensive, mix well with the resinous polymer, provide sufficient and controllable foaming power and should have no residual adverse effect upon the equipment used during the foaming step or on the resulting foamed polymer.

SUMMARY OF THE INVENTION

We have found a foaming agent that meets all of the above requirements and which is suitable for incorporation into a resinous polymer to form a foamable polymer composition. The foaming agent is a mixture of polycyclic aromatic polycarboxylic acids carrying nuclear nitro groups that is substantially soluble in acetone and substantially soluble in water obtained as a result of the nitric acid oxidation of a carbonaceous material, such as coal. The mixture used as a foaming agent herein can be prepared in accordance with the procedure defined and claimed in our U.S. application Ser. No. 814,217, filed July 5, 1977, entitled Organic Acids and Process for Preparing Same.

As noted, the foaming agents are mixtures of polycyclic aromaric polycarboxylic acids carrying nuclear nitro groups that are substantially soluble in acetone and substantially soluble in water. The individual components of said mixtures are believed to be composed of condensed and/or non-condensed benzene rings, with an average number of benzene rings in the individual molecules ranging from one to about three, but generally from one to two. On the average, the number of carboxyl groups carried by the individual molecules are believed to range from about two to about eight, generally from about two to about five, and the average number of nitro groups from about 0 to about four, generally from about 0 to about two. The average molecular weight of the mixture will range from about 200 to about 500, generally from about 300 to about 400, and the average neutral equivalent will range from about 50 to about 200, generally from about 70 to about 120. A typical analysis of the mixture is defined below in Table I in approximate amounts.

TABLE I

|  | Weight Percent | |
| --- | --- | --- |
|  | Broad Range | Preferred Range |
| Carbon | 35 to 60 | 37 to 48 |
| Hydrogen | 1 to 5 | 3 to 4 |
| Nitrogen | 1 to 6 | 4 to 5 |
| Oxygen | 35 to 60 | 40 to 55 |
| Sulfur | 0.1 to 0.4 | 0.1 to 0.3 |
| Ash | 0.1 to 5 | 0.1 to 2 |

A preferred procedure for obtaining the above mixtures is described as follows. There is introduced into a reactor an aqueous solution of nitric acid and a carbonaceous material. The nitric acid can have a concentration of about five to about 90 percent, but preferably will be in the range of about 10 to about 70 percent. The carbonaceous material is preferably a solid in the form of a slurry, for example, an aqueous slurry containing the carbonaceous material in particulate form and from about 50 to about 90 weight percent of water.

The solid carbonaceous material that can be used herein can have the following composition on a moisture-free basis:

TABLE II

|  | Weight Percent | |
| --- | --- | --- |
|  | Broad Range | Preferred Range |
| Carbon | 45 to 95 | 60 to 92 |
| Hydrogen | 2.5 to 7 | 4 to 6 |
| Oxygen | 2,0 to 45 | 3 to 25 |
| Nitrogen | 0.75 to 2.5 | 0.75 to 2.5 |
| Sulfur | 0.3 to 10 | 0.5 to 6 |

The carbon and hydrogen content of the carbonaceous material will reside primarily in multi-ring aromatic compounds (condensed and/or uncondensed), heterocyclic compounds, etc. Oxygen and nitrogen are believed to be present primarily in chemical combination. Some of the sulfur is believed to be present in chemical combination with the aromatic compounds and some in chemical combination with inorganic elements associated therewith, for example, iron and calcium.

In addition to the above the solid carbonaceous material being treated herein will also contain solid, primarily inorganic, compounds which will not be converted to the desired organic mixture, which are termed ash, and are composed chiefly of compounds of silicon, aluminum, iron and calcium, with smaller amounts of compounds of magnesium, titanium, sodium and potassium. The ash content of the carbonaceous material treated will amount to less than about 50 weight percent, based on the moisture-free carbonaceous material, but, in general, will amount to about 0.1 to about 30 weight percent, usually about 0.5 to about 20 weight percent.

Anthracitic, bituminous and subbituminous coal, lignitic materials, and other type of coal products referred to in ASTM D-388 are exemplary of the solid carbonaceous materials which can be treated to produce the organic mixture. Some of these carbonaceous materials in their raw state will contain relatively large amounts of water. These can be dried prior to use herein so that the carbonaceous material has a fixed carbon content that does not exceed 86 weight percent and a volatile matter content of at least about 14 weight percent as determined on an ash-free basis. The carbonaceous material, prior to use, is preferably ground in a suitable attrition machine, such as a hammermill, to a size such that at least about 50 percent of the carbonaceous material will pass through a 40-mesh (U.S. Series) sieve. As noted, the carbonaceous material is slurried in a suitable carrier, preferably water, prior to reaction with nitric acid. If desired, the carbonaceous material can be treated, prior to reaction herein, using any conventional means, to remove therefrom any materials forming a part thereof that will not be converted in reaction with nitric acid herein.

The reactant mixture in the reactor is stirred while being maintained at a temperature of about 15° to about 200° C., preferably about 50° to about 120° C., and a pressure of about atmospheric to about 1000 pounds per square inch gauge (about atmospheric to about 70 kilograms per square centimeter), preferably about atmospheric to about 500 pounds per square inch gauge (about atmospheric to about 35 kilograms per square centimeter) for about 0.5 to about 15 hours, preferably about two to about six hours. In order to obtain the desired mixture without losing appreciable amounts of carboxyl and/or nitro groups on the acids that are formed during the oxidation, and to obtain the desired acids in high yields in the reactor, it is absolutely critical that the reaction conditions therein, namely nitric acid concentration, temperature, pressure and reaction time, be so correlated to minimize and, preferably, to avoid decarboxylation and denitrofication. Gaseous products, such as nitrogen oxides, can be removed from the reactor by any suitable manner.

The reaction product is led to a separator, which can be, for example, a filter or a centrifuge. The filtrate obtained in this separation will contain water, nitric acid, most of the inorganic material (ash) that was present in the carbonaceous charge and the acetone-soluble, water-soluble organic acids used herein.

Separation of the filtrate into its component parts can be effected as follows. It can be passed to a distillation tower maintained at a temperature of about 50° to about 100° C., preferably about 70° to about 90° C., and a pressure of about 10 millimeters of mercury to atmospheric, preferably about 30 millimeters of mercury to about atmospheric. Under these conditions nitric acid and water are removed from the distillation tower. The residual solids are led to a separator where they are subjected to extraction with acetone. The extraction can be carried out at a temperature of about 20° to about 60° C., preferably about 25° to about 50° C., and a pressure of about atmospheric to about 500 pounds per square inch gauge (about 35 kilograms per square centimeter), preferably about atmospheric to about 100 pounds per square inch gauge (about seven kilograms per square centimeter). The solid material (ash) is separated from the solution in any convenient manner, for example, filtration. The acetone solution can then be led to a drier wherein acetone is separated therefrom and the desired acetone-soluble, water-soluble organic mixture used herein is recovered. The temperature in the drier can be, for example, in the range of about 10° to about 60° C., preferably about 20° to about 50° C., the pressure about 10 millimeters of mercury to about atmospheric, preferably about 30 millimeters of mercury to about atmospheric, for about 0.5 to about 24 hours, preferably about one to about five hours.

Although we have stated above that the acetone-soluble, water-soluble organic acids are recovered using acetone, this has been done merely as an exemplification, for many polar solvents, for example, methanol, ethanol, isopropanol, methyl ethyl ketone, tetrahydrofuran, dioxane, cyclohexanone, etc., can be used in lieu thereof. The use of organic acids soluble in any of such polar solvents, therefore, falls within the scope of the invention claimed herein.

The resinous polymers that can be employed herein can include both thermoplastic and thermosetting resins that melt at a temperature up to about 300° C. Thus, the thermoplastic polymers that can be foamed by the use of the foaming agents above described can be virtually any of the thermoplastic polymers known to the art. Thus, for example, the foaming agents can be used to foam styrene polymers, including styrene homopolymers and copolymers of styrene with up to 50% of comonomers such as acrylate and methacrylate esters, acrylonitrile, and the like, graft copolymers of styrene with dienes, particularly the ABS-type graft copolymers, vinyl chloride polymers including vinyl chloride homopolymers and copolymers of vinylchloride with up to 50% of comonomers such as vinyl acetate, vinylidine chloride, esters of fumaric and maleic acid, acrylate and methacrylate esters and so forth. Other suitable resins which can be foamed with the foaming agents here described include the diene rubbers, both natural and synthetic, the acrylate ester polymers, the methacrylate ester polymers, nylon-6, nylon 6,6, the polycarbonates and the newer formaldehyde polymers such as Delrin (a registered trademark of E. I. du Pont) and so forth.

Especially useful foamable compositions are obtained by admixing the foaming agents hereabove described with thermoplastic polymers of a 2-4 carbon atom alpha olefin, e.g., ethylene, propylene, and butene-1. The olefin polymer can be a homopolymer of any one of the olefin species set forth above or can be a copolymer derived solely from these olefins, such as an ethylene-propylene copolymer. The olefin copolymers also can be copolymers having polymerized therein at least fifty weight percent of an alpha olefin with up to fifty weight percent of a vinylidine monomer copolymerizable therewith. Typical examples of suitable comonomers include the vinyl halides such as vinyl chloride, conjugated 1,3-diolefins such as butadiene and isoprene, vinyl esters of monobasic organic acids such as vinyl acetate, vinyl benzoate, and vinyl stearate, esters, amides, and nitriles of alpha,beta-ethylenically unsaturated monobasic acids, such as the methyl, ethyl, and octyl acrylates, the corresponding esters of methacrylic acid, acrylonitrile, methacrylonitrile, acrylamide, and methacrylamide and so forth.

Among the thermosetting resins that can be foamed by the use of the foaming agents above described are epoxy resin formulations, such as a combination of EPON 1004 with benzophenone-3,4,3', 4'-tetracarboxylic dianhydride or EPON 828, with dimethylbenzylsuccinic anhydride and hexyldimethylamine, etc.

In preparing the foamable composition defined and claimed herein any suitable procedure for obtaining an intimate mixture of the foaming agent defined above and the resinous polymer can be used. For example, the components can be admixed by passing them together through rollers, blenders, mixers, etc. It is important, however, that such mixing be carried out at a temperature below the temperature at which the foaming agent decomposes in order to avoid premature foaming. The foaming agent herein will decompose to produce carbon dioxide at a temperature in the range of about 50° to about 350° C., generally in the range of about 100° to about 300° C. When the foaming agent herein decomposes in use it will produce about 10 to about 150 milliliters of gas, substantially carbon dioxide, generally about 50 to about 125 milliliters of gas, per gram of foaming agent.

The weight ratio of resinous polymer to foaming agent in the claimed composition can vary over a wide range, generally in the range of about 100:1 to about 1:1, but usually will be in the range of about 50:1 to about 5:1. If necessary, or if desired, a hardening agent to help set the foamed plastic to prevent a substantial volume reduction, for example, a cross-linking agent or a curing agent, such as benzophenone-3,4,3',-4'-tetracarboxylic dianhydride, dimethylbenzylsuccinic anhydride, allyl cyanurate, divinylbenzene, etc., can also be incorporated into the composition. A free radical initiator, such as cumene hydroperoxide, dicumyl peroxide, etc., a pore size modifier, such as silicon oil, olive oil, etc., an accelerator, such as dimethylbenzylamine, can similarly be included. Each of these can be used in amounts, for example, in the range of about one to about 50 weight percent, preferably about one to about 10 weight percent, based on the combined weight of the resin and the foaming agent. In cases where no additives are included in the foamable composition, the foamed resin obtained can be set by cooling as soon as foaming ceases.

DESCRIPTION OF PREFERRED EMBODIMENTS

Several runs were carried out in which a North Dakota lignite analyzing as follows, on a substantially moisture-free basis, was subjected to oxidation using nitric acid as the oxidant: 65.03 weight percent, 4.0 weight percent hydrogen, 27.0 weight percent oxygen, 0.92 weight percent sulfur, 0.42 weight percent nitrogen and 0.04 weight percent moisture. The ash was further analyzed and found to contain 43 weight percent oxygen, 7.8 weight percent sulfur and the remainder metals.

In each run 100 grams of powdered lignite defined above (corresponding to 67 grams of moisture-free feed), 80 grams of water and 70 percent aqueous nitric acid were added to a reaction zone, stirred and maintained at selected temperature levels and atmospheric pressure. The reaction product was passed to a separator and the filtrate obtained was subjected to distillation to remove nitric acid and water therefrom. The remaining solids were extracted with acetone in a Soxlet extractor and the extract was heated to remove acetone therefrom. The product remaining was the acetone-soluble, water-soluble organic acid mixture used herein. The product is defined below in Table III.

modifier. The stirring was continued for 10 minutes until a homogeneous mixture was obtained and then, similarly, five grams of the acetone-soluble, water-soluble mixture obtained in Run No. 2 and one gram of dicumylperoxide, as a free radical initiator, was incorporated into the mixture. The resulting mixture was placed in an oven maintained at 175° C. for a period of 30 minutes, removed and cooled to room temperature. A good, semi-rigid foam of fine cellular structure having a density of about 0.05 gm/cubic centimeter was obtained. It was found that 50 grams of the mixture before heating had expanded to 310 cubic centimeters of foamed material.

EXAMPLE II

Twenty-five grams of EPON 1004 (Shell Chemical Co.), an epoxy resin believed to be the diglycidyl ether of Bisphenol A having an epoxy equivalent of 900, 0.01 gram of tin octanoate, as an accelerator, five grams of the acetone-soluble, water-soluble mixture obtained in Run No. 3 and four grams of benzonephenone-3, 4,3',4'-tetracarboxylic dianhydride, as a cross-linking agent, were intimately mixed and placed in a glass container which was then immersed in an oil bath maintained at 170° C. for 50 minutes. The heated material was then cooled to room temperature. A rigid foamed epoxy resin was obtained. The original mixture of 25 cubic centimeter before heating had expanded to 120 cubic centimeter.

EXAMPLE III

Twenty grams of EPON 828 (Shell Chemical Co.) having an epoxy equivalent of 0.106, 21 grams of dimethylbenzylsuccinic anhydride, as a curing agent or cross-linking agent, and four grams tin octanoate, as an accelerator, were mixed intimately with five grams of the acetone-soluble, water-soluble mixture obtained in Run No. 3 and the mixture was placed in a 250 milliliter glass jar. The glass jar was immersed in an oil bath maintained at 180° C. for a period of one hour, after which the heated material was cooled to room temperature. The original mixture which had a volume of 44 milliliters had foamed to a volume of 168 milliliters. The rigid foamed epoxy resin was found to have an extremely fine pore structure and possessed excellent crush strength.

EXAMPLE IV

In order to assess the foaming capacity of the mixture of polycyclic aromatic polycarboxylic acids used

TABLE III

| Run No. | Total Milliliters of HNO$_3$ Total | Temperature °C. | Reaction Time, Hours | Acetone-Soluble Water-Soluble Product, Grams | Analysis of Product, Weight Percent | | | | | |
|---|---|---|---|---|---|---|---|---|---|---|
| | | | | | Carbon | Hydrogen | Nitrogen | Oxygen | Sulfur | Ash |
| 1 | 75 | 50 | 5 | 1.8 | 38.87 | 3.25 | 1.80 | 54.14 | 0.20 | 1.74 |
| 2 | 150 | 75 | 5 | 22.4 | 45.23 | 3.57 | 4.30 | 44.81 | 0.19 | 1.90 |
| 3 | 225 | 75 | 5 | 24.3 | 45.97 | 3.33 | 4.50 | 44.18 | 0.17 | 1.85 |
| 4 | 225 | 110 | 5 | 21.2 | 43.54 | 3.35 | 4.60 | 46.36 | 0.15 | 2.00 |

EXAMPLE I

Fifty grams of a copolymer composed of 80 weight percent polyethylene and 20 weight percent methlacrylate having a melt index of 2000 was heated to its melting point (120° C.). To the melted resin there was added, while stirring, three grams of 2-ethylhexyl acrylate and 0.75 gram of triallyl isocyanurate, as cross-linking agents, and 0.5 gram of a silicone oil, as a pore size herein, three grams of the acetone-soluble, water-soluble mixture obtained in Run No. 3 were placed in a 50-milliliter round bottom flash suspended in 25 milliliters of mineral oil for 30 minutes at selected temperature levels and the gas evolution at the end of each heating period was measured.

TABLE IV

| Temperature, ° C. | Milliliter of Gas Evolved Per Gram |
| --- | --- |
| 75 | 2 |
| 110 | 9 |
| 140 | 35 |
| 175 | 75 |
| 200 | 95 |
| 225 | 107 |
| 250 | 120 |
| 300 | 146 |

Not only are the foaming agents present in our foaming compositions particularly effective, as the above examples show, but the gases given off, carbon dioxide, are not toxic or noxious, and the inert residue, primarily carbonaceous, serves as a filler in the foamed resin.

Obviously, many modifications and variations of the invention, as hereinabove set forth, can be made without departing from the spirit and scope thereof and, therefore, only such limitations should be imposed as are indicated in the appended claims.

We claim:

1. A foamable polymer composition comprising a gas-expandable organo plastic resinous polymer and a foaming agent comprising a mixture of polycyclic aromatic polycarboxylic acids carrying nuclear nitro groups that is substantially soluble in acetone and soluble in water which is prepared by subjecting a slurry containing coal to reaction with aqueous nitric acid having a concentration of about 5 to about 90% at a temperature of about 15° to 200° C. for about 0.5 to about 15 hours, mechanically separating the solids in the resulting slurry, removing nitric acid and water from the resulting filtrate, and then extracting the resulting solids with a polar solvent to recover said foaming agent.

2. The composition of claim 1 wherein the resinous polymer is polyethylene.

3. The composition of claim 1 wherein the resin is an epoxy resin.

4. The composition of claim 1 wherein the average number of benzene rings in the individual acid molecules ranges from one to about three.

5. The composition of claim 1 wherein the average number of benzene rings in the individual acid molecules ranges from one to two.

6. The composition of claim 1 wherein the average number of carboxyl groups carried by the individual acid molecules ranges from about two to about eight.

7. The composition of claim 1 wherein the average number of carboxyl groups carried by the individual acid molecule ranges from about two to about five.

8. The composition of claim 1 wherein the average number of nitro groups carried by the individual acid molecule ranges from about 0 to about four.

9. The composition of claim 1 wherein the average number of nitro groups carried by the individual acid molecule ranges from about 0 to about two.

10. The composition of claim 1 wherein the average molecular weight of the acid mixture ranges from about 200 to about 500.

11. The composition of claim 1 wherein the average molecular weight of the acid mixture ranges from about 300 to about 400.

12. The composition of claim 1 wherein the average nuclear equivalent of the acid mixture ranges from about 50 to about 200.

13. The composition of claim 1 wherein the average nuclear equivalent of the acid mixture ranges from about 70 to about 120.

14. The acid mixture of claim 1 wherein the analysis thereof is in the following range:

| | Weight Percent |
| --- | --- |
| Carbon | 35 to 60 |
| Hydrogen | 1 to 5 |
| Nitrogen | 1 to 6 |
| Oxygen | 35 to 60 |
| Sulfur | 0.1 to 0.4 |
| Ash | 0.1 to 5 |

15. The acid mixture of claim 1 wherein the analysis thereof is in the following range (preferred range):

| | Weight Percent |
| --- | --- |
| Carbon | 37 to 48 |
| Hydrogen | 3 to 4 |
| Nitrogen | 4 to 5 |
| Oxygen | 40 to 55 |
| Sulfur | 0.1 to 0.3 |
| Ash | 0.1 to 2 |

16. The composition of claim 1 wherein a hardening agent is also present.

17. The composition of claim 1 wherein an accellerator is also present.

* * * * *